United States Patent
Wu et al.

(10) Patent No.: US 6,813,489 B1
(45) Date of Patent: Nov. 2, 2004

(54) SYSTEM AND METHOD FOR MOBILE ELECTRONIC MESSAGING

(75) Inventors: Christopher M. Wu, Atherton, CA (US); Jay B. Baldemor, Yorba Linda, CA (US); Patrick S. Loo, Fremont, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 10/375,335

(22) Filed: Feb. 26, 2003

Related U.S. Application Data

(60) Provisional application No. 60/361,239, filed on Mar. 1, 2002.

(51) Int. Cl.[7] ............................................. H04M 11/10
(52) U.S. Cl. ..................... 455/412.1; 455/413; 709/206
(58) Field of Search ............................ 455/412.1, 413, 455/466, 414.1, 412.2; 709/206, 245; 379/88.13, 88.17, 88.22, 88.23, 88.25

(56) References Cited

U.S. PATENT DOCUMENTS

| | | | |
|---|---|---|---|
| 6,351,523 B1 | | 2/2002 | Detlef |
| 6,385,306 B1 | | 5/2002 | Baxter, Jr. |
| 6,507,643 B1 | * | 1/2003 | Groner .................... 379/88.14 |
| 6,751,453 B2 | * | 6/2004 | Schemers et al. ........ 379/88.14 |
| 2001/0047391 A1 | * | 11/2001 | Szutu ........................ 709/206 |
| 2001/0049745 A1 | * | 12/2001 | Schoeffler .................. 709/238 |
| 2002/0194279 A1 | * | 12/2002 | Chern ........................ 709/206 |

FOREIGN PATENT DOCUMENTS

WO      WO 98/58491 A2      12/1998

OTHER PUBLICATIONS

Search Report from International Patent Application No. PCT/US03/06052 (dated Feb. 26, 2003).

* cited by examiner

*Primary Examiner*—Charles Appiah
*Assistant Examiner*—James Moore
(74) *Attorney, Agent, or Firm*—Stroock & Stroock & Lavan LLP

(57) ABSTRACT

A method and system for transmitting a voice message to an electronic address, generally includes establishing a data connection between a first server of a voice messaging system and a wireless device so as to enable a user to access an electronic mail account. The first server then captures a wireless device identifier and accesses an association of the wireless device identifier to a telephone number of the wireless device. A call is then initiated from the wireless device to a second server of the voice messaging system to record a voice message. The previously stored recipient electronic address is retrieved using the captured telephone number and an email including a link to the voice message is generated. The email is then transmitted to the recipient electronic address.

27 Claims, 7 Drawing Sheets

SYSTEM AND METHOD FOR MOBILE ELECTRONIC MESSAGING

CROSS-REFERENCE TO RELATED APPLICATIONS

This application claims priority to U.S. Provisional Application Ser. No. 60/361,239, filed on Mar. 1, 2002, which is incorporated herein by reference.

FIELD OF THE INVENTION

The present invention is related to a system and method for wireless voice messaging and, in particular, to a system and method for enabling mobile phone users to receive, compose or reply to electronic mail messages with embedded voice messages.

BACKGROUND OF THE INVENTION

Wireless technologies have exploded over the past few years and the convergence of complementary technologies, such as hand-held computing, have made wireless communication devices quite powerful. Wireless devices include, but are not limited to, mobile phones, personal digital assistants, hand-held computers, laptop computers, and the like.

Presently, wireless device users can access their web-based electronic mail accounts via their wireless devices. For example, a mobile phone user, who has a Yahoo web-based mail account, can access and receive the text of the e-mails in their Yahoo mail account. These present systems also enable the wireless device user to respond to such e-mails. To do this, however, the user typically must use the archaic triple-tapping method or other inefficient and time consuming methods, such as using "canned" messages or T9 technology. In some instances, the user may be able to connect a keyboard to the wireless device—as is the case with some personal digital assistants (PDAs) that are capable of accessing the Internet wirelessly, such as WAP-enabled PDAs. However, many-users choose to or need to access their e-mail accounts, while traveling or during a commute to and from their workplace. Thus, using keyboards is not a practical solution to the problem.

Thus, due to the present inefficient methods for composing e-mail messages on one's wireless device, users have not widely used these messaging systems and mobile phones or other wireless devices have been used predominantly for electronic message retrieval.

SUMMARY OF THE INVENTION

Generally speaking, exemplary embodiments of the present invention enable mobile phone users to reply to electronic mail (referred to herein as "email") or create and send email that includes a voice message. By eliminating the need to key-in replies to email, the wireless device user can more efficiently access and use their POP, IMAP, or other type of email account when away from the home or office computer.

According to an exemplary embodiment, a method of transmitting a voice message to an electronic address, generally includes establishing a data connection between a first server system of a voice messaging system and a wireless device so as to enable a user to access an email account. The user will be presented with the option to reply to or forward existing emails with a voice message or compose new voice messages. Once the user chooses a particular option, the server system attempts to capture a wireless device identifier from the user's wireless device. If no wireless device identifier, then the user is prompted to input and transmit his/her wireless telephone number. If the wireless device identifier is captured, the server system accesses an association of the wireless device identifier to the users wireless telephone number to retrieve the wireless telephone number. A first mapping of the user's wireless telephone number to a recipient electronic address is then stored on a database system in communication with the first server system. The recipient electronic address is associated with either a message retrieved by the user from the user's electronic mail account or inputted by the user through the wireless device.

Once the user has completed addressing the message, a call is initiated from the wireless device to a second server system of the voice messaging system. Preferably, using caller id, the second server system captures the user's wireless telephone number of the wireless device. Where a digital communication connection is present, the second server may instead retrieve a wireless device identifier. The second server system can then retrieve the stored recipient electronic address using the captured telephone number. Next, the user is prompted to record a voice message and an electronic message including a link to the voice message is generated and transmitted to the recipient electronic address stored in the first database system.

Thus, wireless devices that are both voice and data capable, such as WAP-enabled and J2ME enabled devices, enable a user to record a voice message in response to an e-mail—in place of the more traditional typed response.

Other objects and features of the present invention will become apparent from the following detailed description, considered in conjunction with the accompanying system schematics and flow diagrams. It is understood, however, that the drawings, which are not to scale, are designed solely for the purpose of illustration and not as a definition of the limits of the invention, for which reference should be made to the appended claims.

BRIEF DESCRIPTION OF THE DRAWINGS

In the drawing figures, which are not to scale, and which are merely illustrative, and wherein like reference numerals depict like elements throughout the several views:

FIG. 2b is a continuation of the flow diagram of FIG. 2a;

DETAILED DESCRIPTION

With reference generally to the FIGS., there is shown and described a voice messaging system 10 and method for transmitting voice messages to an electronic mail account in accordance with exemplary embodiments of the present invention. Unlike known systems, which simply attach a sound file to an email, the voice messaging system 10 embeds a link to a steaming audio file or non-streaming audio file in the email, so that the receiving party can directly access the voice message. For example, the recipient of the voice message receives an e-mail from the wireless device user, which includes a link to the voice message. In an alternate embodiment, the voice message is forwarded directly to the recipient's voice mail account associated to the recipients e-mail account. In this way, the step of requiring the recipient to retrieve the voice message from his/her e-mail account is removed. Moreover, voice messaging system 10 enables a user to reply with a voice message, thereby advantageously eliminating the need to type a response. The streaming audio file may be Windows (.asf) or Real Networks (.ram) media formats or any other audio format hereto or hereafter known or developed. The non-steaming audio file may be in a .wav (wave file format), PCT, mu-law, and the like.

The exemplary embodiments described herein generally operate over a wireless network, such as by way of example a WAP-enabled network, to permit wireless communication. As used herein, the term "WAP-enabled" generally refers to networks and devices that are capable of sending and receiving data in a wireless manner using the wireless application protocol. As is generally known in the art, the wireless application protocol ("WAP") is a secure specification that allows users to access information instantly via wireless devices, such as mobile phones, pagers, two-way radios, communicators, and the like. WAP supports most wireless networks, including CDPD, CDMA, GSM, PDC, PHS, TDMA, FLEX, ReFLEX, iDEN, TETRA, DECT, DataTAC, and Mobitex, and can operate with many handheld device operating systems, such as PalmOS, EPOC, Windows CE, FLEXOS, OS/9, and JavaOS. Typically, WAP-enabled devices use LED or color graphical displays and can access the Internet (or other communication network) on so-called mini- or micro-browsers, which are web browsers with small file sizes that can accommodate the reduced memory constraints of handheld devices and the low-bandwidth constraints of a wireless networks.

It will be further understood that WAP-enabled devices are only one exemplary type of wireless communication device capable of being used in connection with the present invention. Those of skill in the art will recognize that any wireless data communication technology now known or hereafter developed may be used in connection with the exemplary embodiments of the invention described herein.

Figure 1:
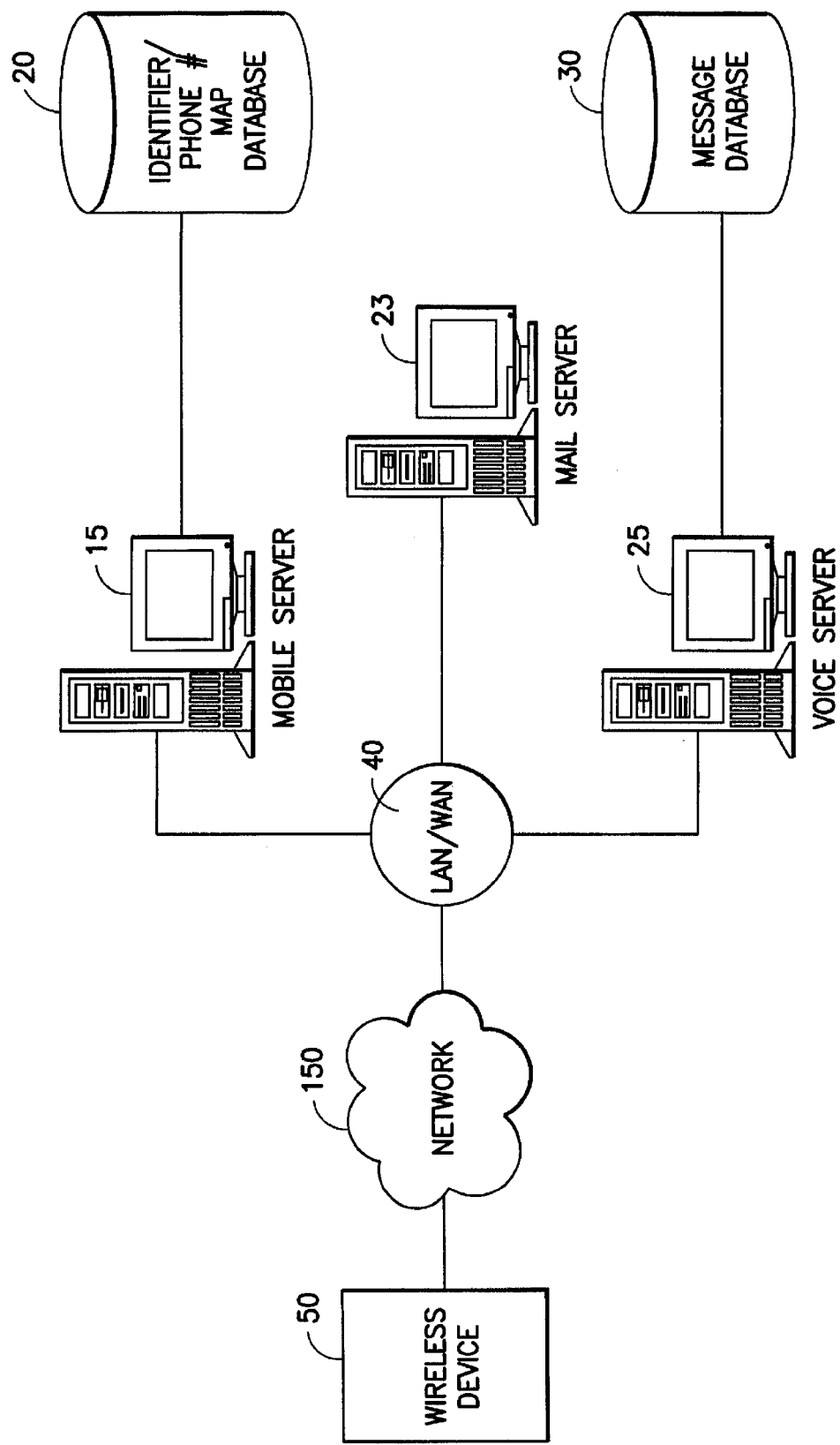
FIG. 1 is an overview of a system architecture in accordance with an exemplary embodiment of the present invention.

With reference to FIG. 1, the voice messaging system 10 preferably includes one or more server and database systems in communication with one another and capable of wirelessly communicating with the wireless devices of a plurality of users. In an exemplary embodiment, as shown in FIG. 1, voice messaging system 10 generally includes a mobile server system 15 and a voice server system 25, which are communicatively connected to respective database systems 20 and 30, and may further include a mail server 23 communicatively connected to mobile server 15 and voice server 25. It should be noted that although the exemplary embodiments described herein describe use of separate servers and databases for performing the various functions of the voice messaging system 10, other embodiments could be implemented by storing the software or programming that operates the described functions on a single server or any combination of multiple servers as a matter of design choice so long as the functionality described herein is performed. Although not depicted in the figures, the server systems 15, 23, and 25 generally include such art recognized components as are ordinarily found in server systems, including but not limited to processors, RAM, ROM, clocks, hardware drivers, associated storage, and the like. One skilled in the art will recognize, however, that because multiple users may be accessing such servers at any given time it is preferable to utilize multiple servers and databases, which may be used separately or in tandem to support the systems traffic and processing, such as, by way of non-limiting example, a round-robin configuration utilizing multiple server systems.

Moreover, as will become evident from the following description and associated FIGS., users are in communication with the voice server system 15 and message server system 25 via global communication networks 150, such as for example, cellular, satellite or other wireless communication network. One skilled in the art will also recognize that network 150 may also include a non-wireless component, such as, for example, the Public Switched Telephone Network (PSTN), cable or fiber optic networks. As such, it should be recognized that although the wireless device 50 is itself in wireless communication with some portion of network 150, network 150 may be comprised of any number of different types of communication devices enabling the transmission of voice and data. It will also become apparent, that the various system components of the voice messaging system 10 are communicatively coupled to each of the other via a communication network 40 such as local or wide area network (LAN or WAN).

Generally speaking, the mobile server system 15 communicates with the users' wireless devices 50 over a data communication connection to permit the transmission of data, whereas the voice server system 25 communicates with the users' wireless devices 50 over more traditional digital or analog wireless voice connections. Adapting server systems such as those described herein to wirelessly communicate with one or more wireless devices is well known to those of skill in the art.

In an exemplary embodiment, as shown in FIGS. 2–5, the wireless device 50 establishes a data connection with mobile server system 15 of the voice messaging system 10 so that the two devices can communicate. Through this data connection, the wireless device 50 is capable of retrieving and/or viewing emails received in the user's email account on mail server 23. If the user elects to reply to an email with a voice message, the mobile server system 15 attempts to capture a wireless device identifier, which may include the device's mobile identity number ("MIN"), as defined below, or other stored identifier that uniquely identifies the user's wireless device 50. If the wireless device identifier is unavailable, then the user is prompted to input and transmit his/her wireless telephone number. Depending on whether the wireless device 50 is capable of making digital phone calls or is limited to analog calls, either the wireless device identifier (digital) or the wireless telephone number (analog) will be used to associate the email addresses of recipients of the users voice messages with a particular voice message, as is described in further detail below.

Preferably, the user has at least three possible choices when accesses his/her email account: (1) reply to an existing e-mail; (2) forward an existing e-mail to a new address; or (3) compose a new e-mail. In either instance, the wireless device 50 transmits one or more recipient electronic addresses to the mobile server system 15. Depending on whether the wireless device is digital or analog capable, the recipient electronic addresses are mapped to the wireless device identifier or the wireless telephone number and stored in the database system 20.

Once this process is completed, the mobile server system 15 may prompt the user to either continue viewing emails or begin the voice message recording session. If the user selects to begin the voice message recording session, data connection is terminated and the user is prompted to initiate a call to the voice server system 25 of the voice messaging system 10. This call may be either analog or digital (e.g., Voice-over-IP ("VOIP")). In response to various prompts, the user records a voice message, which is stored in a second database system 30.

During the recordation process, in the case of a digital connection, the voice server system 25 attempts to capture the wireless device identifier. In this scenario, once the device identifier is captured, the voice server system 25 can access the mapping of the wireless device identifier to any stored recipient electronic addresses and, in turn, determine whether the user has any outgoing messages pending. If messages are pending the voice server system 25 retrieves the recipient's electronic addresses and prompts the user to select which addresses should be associated with which voice message. The process of recording the voice message is described in greater detail below.

In the case of an analog connection, the voice server system 25 instead attempts to capture the wireless device's telephone number by accessing caller-id. If caller ID is blocked, then the system prompts the user to input the telephone number. Again using the telephone number, the voice server system 25 can associate the wireless device with an outgoing recipient address. Upon completion of the recordation phase, the voice message is transmitted to the selected recipient's electronic address.

Figure 2A:
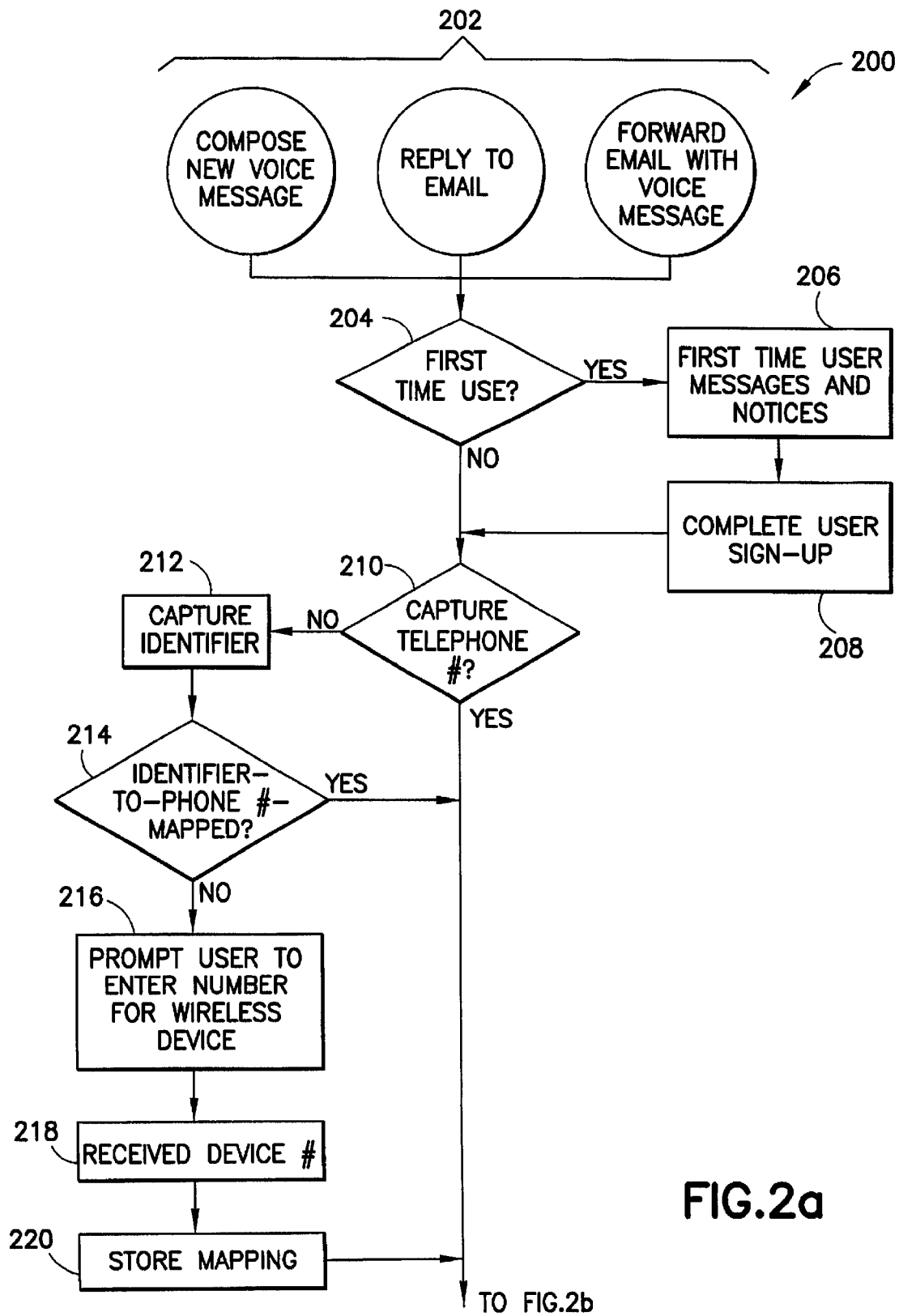
FIG. 2a is a flow diagram of an exemplary method of interaction with a user of the system of FIG. 1.

With reference further to FIG. 2, there is shown and described an exemplary method 200 of interaction between the voice messaging system 10 and a user which enables the user, in a step 202, to receive and compose or forward messages or reply to existing messages using a wireless device 50. By way of example only, a user can access and retrieve emails from various electronic mail accounts, using the wireless application protocol (WAP) feature or other data communication protocol of the wireless device 50. One skilled in the art will recognize that the Wireless Application Protocol (WAP) is only one way in which a wireless device can access data on a network and that any such data transfer technology may be used to access and transfer electronic data. Upon accessing a mail account and reviewing his/hers emails, the user may wish to reply to a message, forward a message, or compose a wholly new message. If the user selects to reply, forward or compose a new message and selects to include a voice message component, then the user is placed in communication with mobile server 15. Upon establishing the connection, in step 204, mobile server 15 first attempts to detect whether or not this is the user's first time using the voice message system 10. If it is the user's first time using the voice message system 10, then, in step 206, the mobile server 15 begins a user sign-up routine. It will be understood that the user sign-up routine can be operated by any one of the servers depicted in FIG. 1 or another server in communication with communication network 40 and the user information may be stored on any associated database. As shown in step 206 (and more particularly in FIG. 3) this routine may include the display various messages and notices to the user involving the use of the voice message system 10. For example, notices such as the terms of service or privacy statements regarding use of the voice message system 10 can be displayed to the user. If the user accepts or agrees to all of the messages and notices displayed, then the user mobile sever 15 continues with the sign up process, which will be further described below in connection with FIG. 3.

Once the sign up is completed and/or if the user has already signed up (see step 208), the mobile server 15, in a step 210, attempts to capture either the wireless telephone number or wireless device identifier for the user's wireless device 50. In some instances, the wireless telephone number may be captured. However, in some cases the mobile server system 15 will not be able to capture the wireless telephone number, because many wireless communication providers encrypt the number for their customer's privacy. In steps 212 and 214, if the wireless telephone number cannot be captured, the mobile server 15 captures the device's Mobile Identity Number or other wireless device identifier.

Due to various privacy laws, rules and regulations, many, but not all, wireless communication providers use MIN's to render the user's actual telephone number inaccessible to third parties. One skilled in the art will recognize that the term MIN refers to an encrypted form of a user's wireless telephone number and that use of the term MIN shall be understood to include any encrypted form of a user's telephone number that a wireless communication provider may make accessible to a third party, regardless of name or form. In an alternate embodiment, the wireless identifier may be stored on the wireless device, for example in the form of a cookie, so that it can be retrieved even if the wireless communication provider does not use MINs.

As described above, the wireless telephone number is used by the voice messaging system 10 to ensure that the user's voice message is transmitted to the correct recipient. Thus, where the wireless telephone number cannot be captured over the wireless data connection to the mobile server 15, the wireless identifier is used to retrieve a previously stored mapping of the wireless identifier to the wireless telephone number for that device 50. If a mapping has not been stored in database system 20, then, in step 216, the mobile server prompts the user to enter the device number into the wireless device using a keypad (or other input device) for transmission to the mobile server 15. Once mobile server 15, in step 218, receives the device number a mapping of the captured MIN (or other wireless identifier) to the wireless telephone number as entered by the user is stored in database 20 for future use in step 220.

Figure 2B:
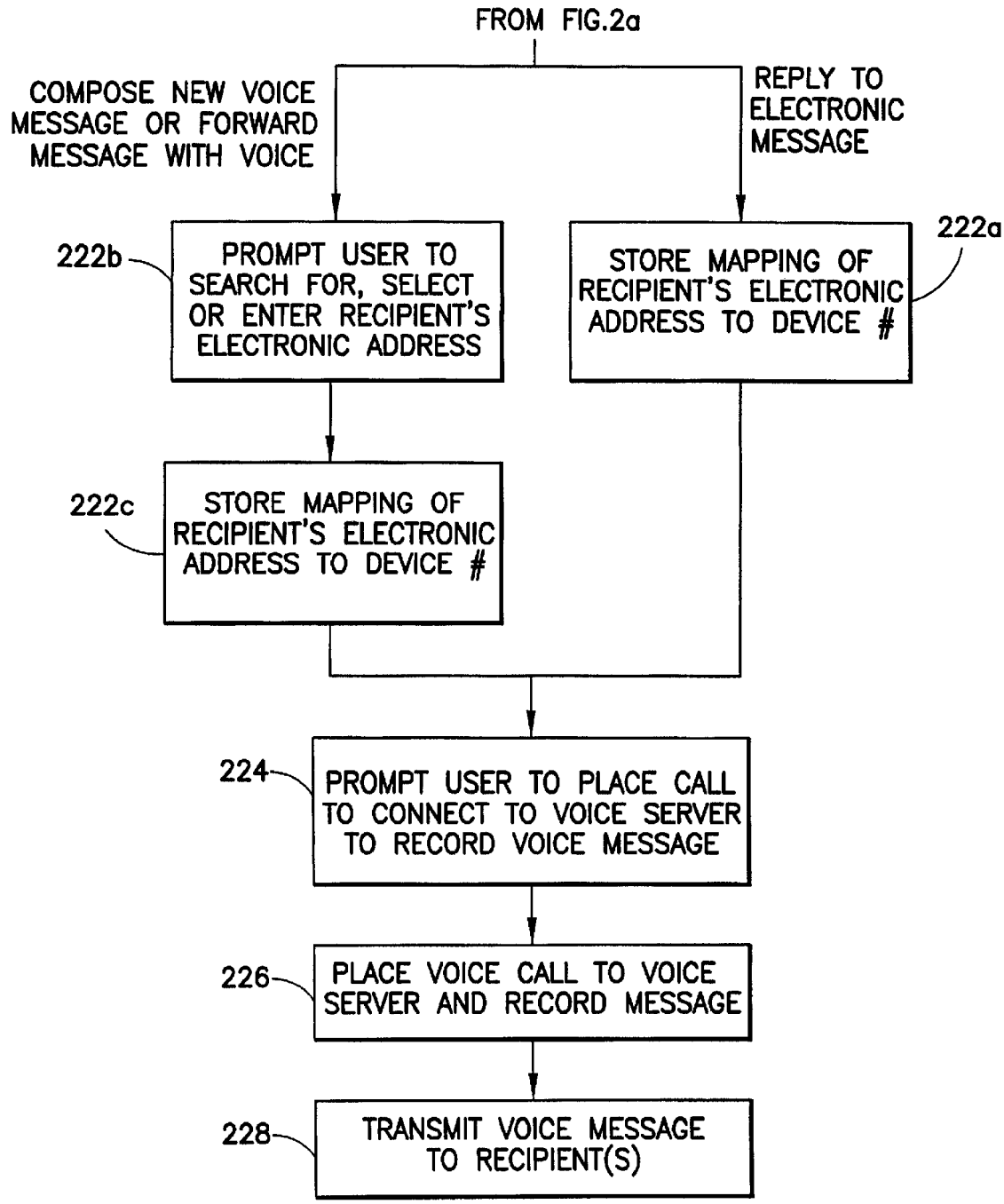

Once the wireless device 50 has been identified by the mobile server system, the user is presented with at least two possible paths depending on the type of action initiated by the user: reply with voice or forward with voice or compose new message with voice, as shown in FIG. 2*b*. The latter two options involving substantially the same operation and are therefore described together in connection with FIG. 2*b*. If the user is replying to an electronic message with a voice message, then, in step 222*a*, a mapping of the original sender's electronic address (now the recipient of a reply message) to the device number is stored in database 20. One skilled in the art will recognize that storing a mapping of the device telephone number to the recipient's e-mail address is exemplary and that any other database interconnected to the voice messaging system 10 may be used to store such information. On the other hand, if the user is composing a new message or forwarding the message to another recipient, then, in step 222*b*, the mobile server 15 prompts the user to search for, select, or enter the recipient's electronic address.

By way of non-limiting example, many wireless devices, such as PDAs and mobile phones, have a feature that enables the user to store contact information, which in many instances includes a email addresses. Such devices also permit the user to search for previously stored addresses or create quick lists to facilitate the location of frequently used addresses. Of course, to the extent that the device does not permit such storing or searching, the address can be manually entered by the user. Once the user has made a selection of or has entered the recipient's address, a mapping of the recipient's address to the device number is stored in database 20 in step 222c as described above.

In either case, upon acquiring the recipient's address, the mobile server 15 prompts the user to place a call to connect to the voice server system 25 to record the voice message, in a step 224. For instance, the mobile server 15 can transmit the telephone number for the voice server system 25 to the user's wireless device. Upon placing the telephone call, in step 226, either a digital or analog connection between wireless device 50 and voice server system 25 is established. The resulting process that next occurs depends on whether the connection is digital or analog and, therefore, is separately described below.

If the connection is digital, the voice server system 25 attempts to capture the wireless device identifier, which may be a stored data file, such as a cookie, or the MIN. Once the identifier is captured, the voice server 25 can retrieve the device number from the stored mapping in database 20 and, in turn, retrieve the recipient's electronic address previously stored. As will be described in greater detail in connection with FIG. 4, the voice server 25 then prompts the user to begin recording the voice message. Preferably, a voice prompting system is utilized to interact with the user. Once the voice message is recorded, the voice server 25 transmits the voice message to the identified recipient's electronic address, in step 228.

Alternatively, if the connection is analog, then data cannot be transmitted between the wireless device 50 and the voice sever 25. To overcome this problem, the voice server system 25 attempts to capture the device number using known caller ID technologies. If, however, caller ID has been blocked or is unavailable, the user is prompted to manually enter the device number using known tone-detection technologies. Once the device number is captured, the voice server system 25 uses the telephone number to retrieve the previously stored recipient address.

Figure 4A:
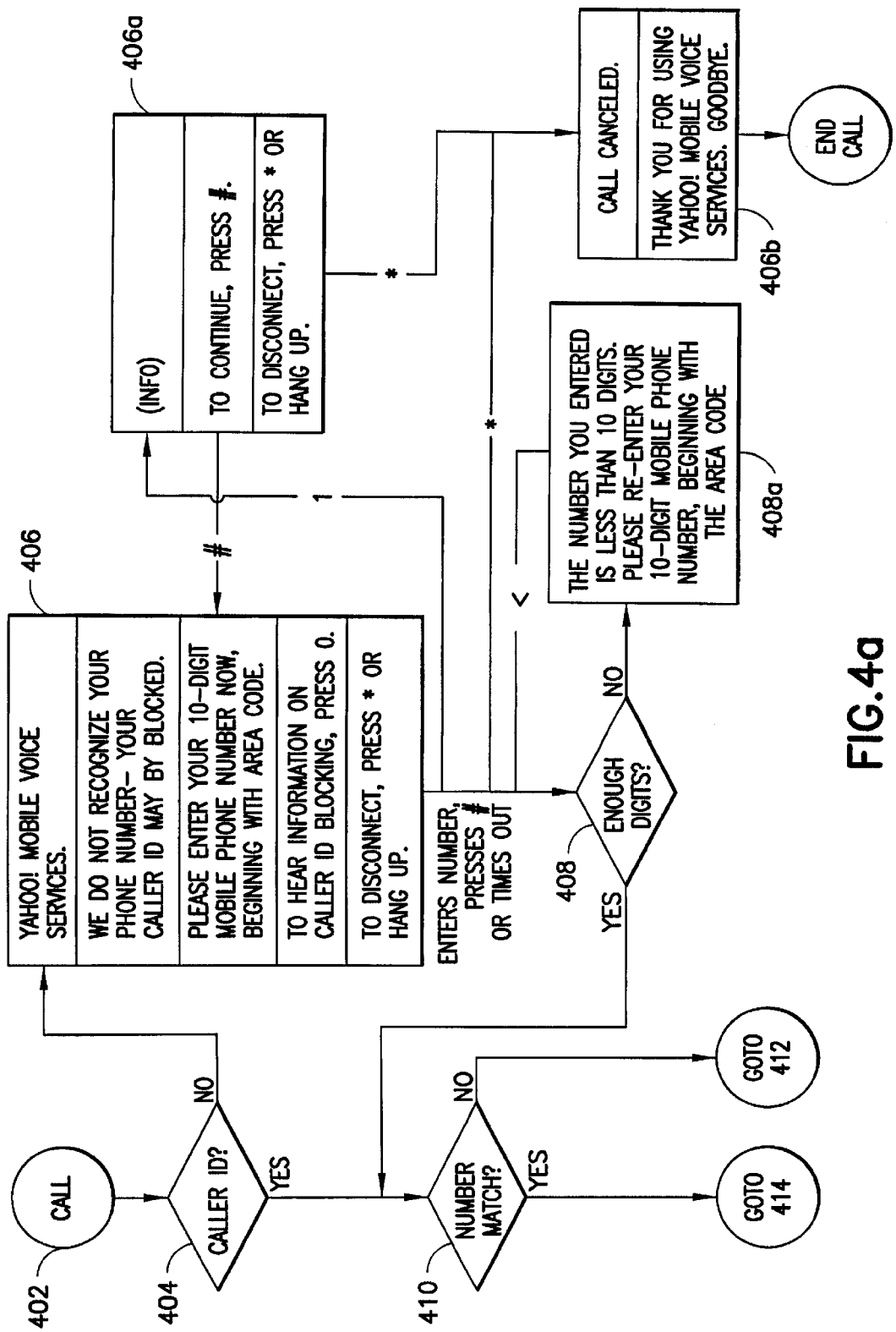
FIG. 4 is a flow diagram of an exemplary embodiment of capturing a voice message in accordance with the present invention.
Figure 4B:
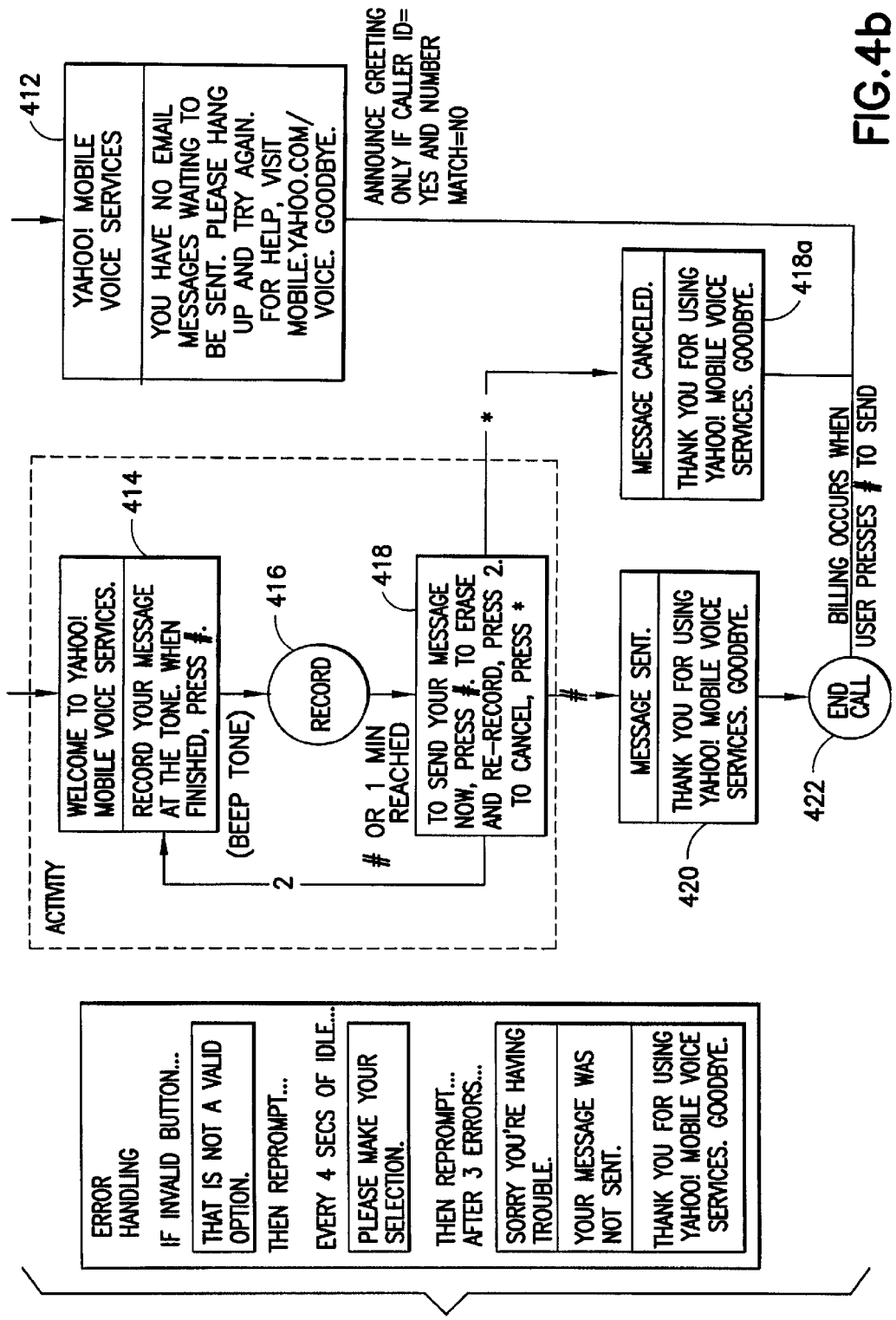

With further reference to FIG. 4, there is shown in more detail an exemplary embodiment of the interaction between the user and voice server 25. Upon connection of the call, in step 402, voice server 25 determines whether it can detect the device number of the caller in step 404. If it cannot, then, in step 406 prompts the user to enter the device number or as described above attempts to detect the MIN so as to retrieve the device number from the MIN/Device number mapping previously stored in database 20. Any point the caller can choose to end the call in steps 406a and 406b. Upon entry of the number, in step 408, the voice server 25 determines whether a sufficient number of digits have been entered. If less than the required number of digits are entered then, in step 408a the voice server 25 prompts the user to re-enter the number. Once this information has been received, or if the device number can be captured, in step 410, voice server 25 attempts to match the entered or captured telephone number to any messages that may be waiting in the user's account to be sent. Because the message (and recipient's address) that was either created or replied to has been previously mapped to the device number, a match can be made for any messages mapped to the particular device number. If a match is made, the voice server 25 prompts the user to record the message at, by way of non-limiting example, at the sound of a tone, in steps 414–416. If, however, there are no messages waiting to be sent, then, in step 412, the voice server 25 ends the call.

Once the user finishes recording the message, the voice server 25 may permit the user to listen to the message, in step 418, so that the user can decide whether to erase or re-record the message or to cancel the message all together. If the user does not elect to cancel or re-record the message, then, in step 420, the voice server 25 transmits the voice message to the recipient's electronic address and the call is ended in step 422. It should be understood that although the exemplary embodiments described herein have used the wireless device's number as the common mapping correlation, any code, ID or password may be used to correlate the recipient's address to the voice message that is being composed, forwarded, or embedded in a reply.

Figure 3:
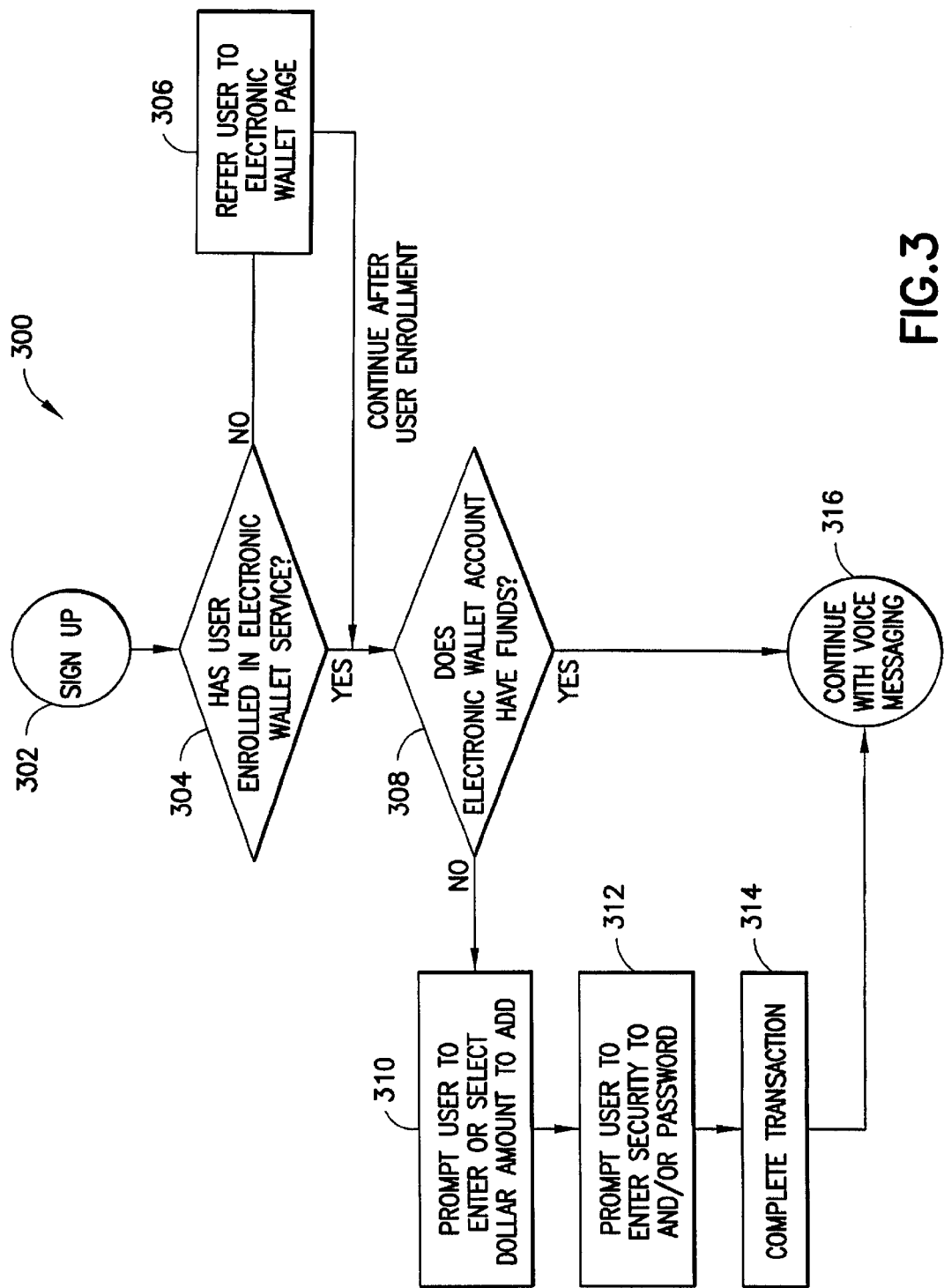
FIG. 3 is a flow diagram of an exemplary method of signing-up new users of the system of FIG. 1.

With reference to FIG. 3, there is shown an exemplary embodiment of a method 300 of signing-up new users to the service in which a fee is paid each time a user uses the voice message system 10. Once a user accesses mobile server 15, the sign-up process is begun in step 302 and mobile server 15 detects whether the user has previously enrolled in an electronic wallet service that has been approved for use with the voice message service 10 in step 304. If the user has not previously enrolled in such a service, then, in step 306, the user is referred to information that would permit the user to enroll in such a service. One skilled in the art will recognize that the process of enrolling in the electronic service is not critical to the present invention and may be performed in any manner according to design choice. For example, the user can be directed to a web site offering such a service or given the opportunity to sign-up using the wireless device. If the user is already enrolled in an electronic wallet service or upon completion of enrollment, the mobile server 15 detects, in step 308, whether the electronic wallet account has sufficient funds to use the voice messaging service. If the account does not have sufficient funds, then, in step 310, the mobile server 15 prompts the user to enter or select a dollar amount to be added to the account. Once this selection or entry is made, the user is prompted to enter a security ID and/or password in step 312. If the security ID and/or password are identified, then the transaction is completed and funds are added to the electronic wallet, in step 314, in a manner known in the art. The new user or user lacking sufficient funds is then transferred back to the process for creating and transmitting a voice message, in step 316, as described above.

Figure 5:
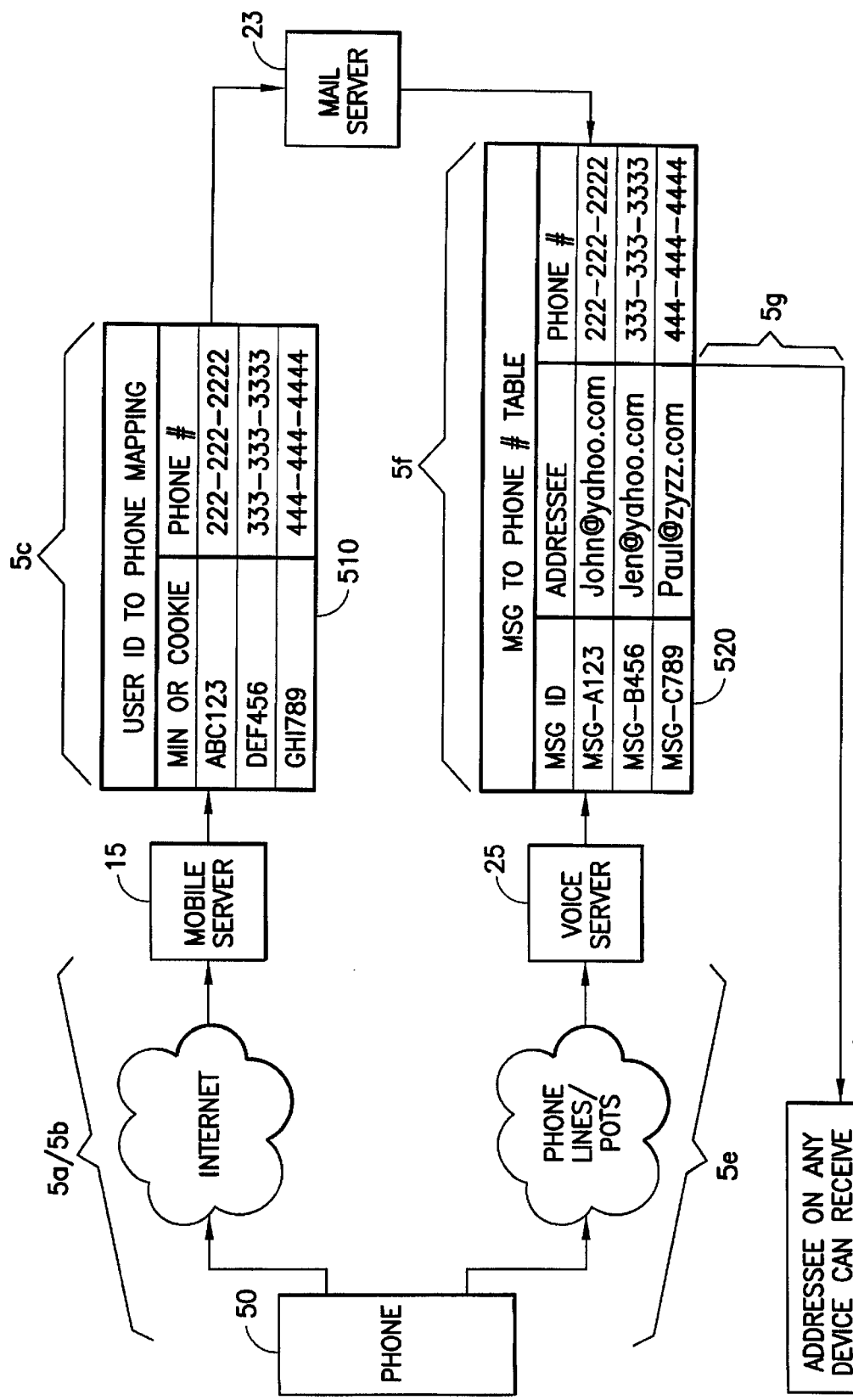
FIG. 5 is a schematic depicting an exemplary method of permitting a user to reply, forwarding, or compose an electronic message having a voice component in accordance with the present invention.

With reference now to FIG. 5, there is shown a schematic of an exemplary method of permitting a user to reply to a retrieved e-mail, forward the e-mail to a new recipient, or compose a fully new voice message to an e-mail recipient. In a first step 5a, the user retrieves an e-mail from the user's e-mail account on mail server 23 and elects to respond to the message using his/her wireless device with a voice message 2, in a next step 5b, the mobile server 15 captures a wireless identifier from the wireless device, which could be a name or a previously stored cookie. As previously described, and more particularly shown in Table 510, a mapping of the wireless ID to the wireless device phone number is stored. Upon capturing the wireless identifier for the wireless device, the mobile server 15 accesses this mapping to determine whether the phone number exists for the particular identifier that is captured. If no phone number exists, the user is then prompted to manually enter the phone of his/her wireless device. At this time, a mapping is saved so that the telephone number does not need to be inputted again by the user. In a next step 5c, the active message that is being created or forwarded or replied to is associated with the phone number of the wireless device being used and placed into a cue as shown in Table 520 by mail server 23. At this time, the wireless data connection is terminated and a phone call is trigger from the wireless device to a voice server 25. Next, in step 5e, the voice server 25 attempts to detect the phone number of the wireless device using caller ID. If the caller ID is not available, the user is asked to manually input the phone number, as described in detail above. In a next step 5F, the phone number is used to find the correct message and recipient's address for that particular phone number from Table 520. Once the correct recipient's address and message are found, the user is prompted to record a voice response and the voice server 25 forwards the response to the addressee identified in the active message, in step 5g. The message can be in the form of a link to a stream audio file that is embedded in the e-mail forwarded to the recipient or it can be delivered in the form of a native audio file. The addressee or recipient can then receive the message on any device capable of receiving such e-mails.

In accordance with an additional aspect of the present invention, a wireless device user can receive electronically transmitted voice messages via their wireless device. Thus, if a particular user has received voice messages in his/her email account, the user can retrieve and listen to said messages using his/her wireless device 50. In a first embodiment, the user wirelessly accesses an email account that includes one or more emails containing voice messages. When the email containing the voice message is selected, the voice messages, which is preferably stored in a highly compressed format such as, by way of non-limiting example, a Microsoft GSM audio file, along with a media player for playing the voice message is pushed to the user's wireless device and the voice message is played. In the present exemplary embodiment, the media player is preferably self-executing so that it automatically launches and begins playing the voice message upon download completion.

In an alternate embodiment, in order to minimize the need to download a media player file, at sign-up a media player is transmitted to, and loaded and stored on the wireless device 50 for future playback of voice messages. In either case, the user can reply to the voice message or any other emails with a voice message as described herein.

In yet another alternate embodiment, the user can create an email account with the voice messaging system 10 from which to emails can be retrieved using the user's wireless device 50 as described herein. Preferably, the mail server 23 will be communicatively linked to the voice server system 25. When an email is received into the users account on mail server 23, programming on the mail server 23 determines whether the email contains a voice message. The mail server 23 then extracts the voice message from the email and uploads the voice message file to the voice server system 25. The voice server system 25 retrieves the user's wireless telephone number from database system 30 and initiates a call to the user's wireless device 50. In either case whether the user answers the call or the user's voice mail picks-up the call, the voice server system 25 plays the voice message so that it can be received by the user's wireless device 50. In this way, voice messages initially transmitted via email can be pushed directly to the user/recipient without the need for the user/recipient to access his/her email account. One skilled in the art will recognize that although it is preferable that the voice messaging system further comprise mail server 23 to locally receive and store emails containing voice messages, it is within the scope of the invention that an external email account could be used in a similar fashion to deliver voice messages to the user.

It is also within the scope of the present invention to operate on wireless networks that are capable of transmitting and receiving both voice and data simultaneously. In such systems, the step of disconnecting the data connection and establishing a separate voice connection can be eliminated altogether.

Thus, while there have been shown and described and pointed out fundamental novel features of the invention as applied to exemplary embodiments thereof, it will be understood that various omissions and substitutions and changes in the form and details of the disclosed invention may be made by those skilled in the art without departing from the spirit of the invention.

What is claimed is:

1. A method of transmitting a voice message to an electronic address using a wireless device, the method comprising:

establishing at a mobile server a first communications connection with the wireless device;

transmitting to the wireless device an email message retrieved by the mobile server from a mail server, capturing a wireless device identifier of the wireless device, the mobile server storing an association of the wireless device identifier with an electronic address of the sender of the email message;

receiving from the wireless device at the mobile server a signal to generate a reply to the email message;

establishing at a voice server a second communications connection with the wireless device;

prompting the user to speak into the wireless device after an indication; and capturing the voice message at the voice server as it is spoken;

associating the voice message with the wireless device identifier;

retrieving at the voice server the electronic address of the sender of the email message from the mobile server;

generating at the voice server an electronic message which includes the recorded voice message; and transmitting from the voice server the electronic message to the electronic address of the sender of the email message.

2. The method of claim 1, wherein the mobile server creates the association of the wireless device identifier with an electronic address of the sender of the email message by:

receiving into the mobile server the wireless device identifier;

receiving into the mobile server the electronic address of the sender of the email message from the mail server; and mapping at the mobile server the wireless device identifier to the electronic address.

3. The method of claim 2, wherein the wireless device identifier is an alphanumeric code.

4. The method of claim 2, wherein the wireless device identifier is a mobile identity number.

5. The number of claim 2, wherein the wireless device identifier is a wireless telephone number.

6. The method of claim 1, wherein the indication is a tone.

7. The method of claim 1, wherein the indication is a beep.

8. The method of claim 1, wherein the step of associating the voice message with the wireless device identifier comprises:

capturing the wireless device identifier; and mapping the recorded voice message to the captured wireless device identifier.

9. The method of claim 8, wherein the second communications connection with the voice server is digital and the step of capturing the identifier comprises receiving a data transmission of the wireless device identifier.

10. The method of claim 8, wherein the second communications connection with the voice server is analog and the step of capturing the wireless device identifier comprises receiving the wireless device identifier via call id.

11. The method of claim 8, wherein the second communications connection with the voice server is analog and the step of capturing the identifier comprises:
prompting a user of the wireless device to input the wireless device identifier using key strokes; and
receiving at the voice server the key strokes.

12. The method of claim 1, wherein the step of generating the electronic message which includes the recorded voice message comprises embedding a link to the voice message in the electronic message.

13. The method of claim 1, further comprising converting the voice message into a streaming media format.

14. The method of claim 1, further comprising converting the voice message into an audio data file.

15. The method of claim 1, further comprising:
accessing data stored on a memory of the wireless device to retrieve the wireless device identifier.

16. The method of claim 1, further comprising:
enabling a user to retrieve an electronic message from an electronic mail account on the mail server using the wireless device;
providing one or more options to the user to create a new electronic message or reply to the retrieved electronic message; and
receiving the electronic address at the mobile server as a result of a selection by the user of one of the options.

17. The method of claim 16, wherein one of the options is to reply to an existing electronic message to a sender of the existing electronic message.

18. The method of claim 16, wherein one of the options is to forward an existing electronic message to a new recipient.

19. The method of claim 16, wherein one of the options is to create a new electronic message.

20. A system for generating and delivering electronic mail including a voice message to an electronic address using a wireless device wherein the wireless device is capable of wireless communication, the system comprising:
a server system including a mobile server and a voice server communicatively interconnected on a network, wherein the mobile server is further capable of communication with one or more wireless devices;
a database system communicatively interconnected to the server system;
wherein a first communications connection is established between the wireless device and the mobile server and the mobile server is operative with programming to:
retrieve one or more email messages from a mail server in response to a request received from the wireless device;
provide the wireless device access to the one or more emails;
receive an indication from the wireless device to generate an electronic message that will include a voice message;
receive at the mobile server an electronic address to which the electronic message will be delivered, detect at the mobile server a wireless device identifier of the wireless device, map at the mobile server the wireless device identifier to the electronic address, and store the mapping in the database system;
wherein a second communications connection is established between the wireless device and the voice server and the voice server is operative with programming to:
record the voice message transmitted by the wireless device;
receive the wireless device identifier;
retrieve the electronic address mapped to the wireless device identifier from the database system;
store an association of the voice message with the appropriate electronic address in the database system;
generate an electronic message including the voice message that is addressed to the appropriate electronic address; and
transmit the electronic message including the voice message to the appropriate electronic address.

21. The system of claim 20, wherein the mail server is a part of the server system.

22. The system of claim 20, wherein a link to the voice message is included in the electronic message and not the voice message.

23. The system of claim 20, wherein the voice message is a streaming media file.

24. The system of claim 20, wherein the electronic message is a response to an email message received on the mail server.

25. The system of claim 20, wherein the electronic message is an email message received on the mail server that is forwarded to a new recipient.

26. The system of claim 20, wherein the mobile server is further programmed to charge a fee to a pre-stored account of a user of the wireless device in return for providing functionality to generate and deliver electronic mail including a voice message to an electronic address.

27. A computer implemented method for permitting the creation of email messages that include a reference to a voice message using a portable wireless device, the method comprising:
at a first server,
providing access to one or more email accounts having one or more email messages stored therein to the portable wireless device upon establishment of a first communications connection between the wireless device and the first server;
receiving a request to generate an electronic message including a reference to a voice message from the portable wireless device;
charging a fee to a pre-stored account;
receiving an address for transmission of the electronic message;
receiving a wireless device identifier from the portable wireless device;
creating a mapping of the wireless device identifier to the address;
storing the mapping; and
at a second server,
recording a voice message upon establishment of a second communications connection between the wireless device and the second server;
receiving a wireless device identifier from the portable wireless device;
retrieving the mapping of the wireless device identifier to the address;

associating the voice message with the appropriate address using the mapping;
generating the electronic message including the reference to the voice message; and
transmitting the electronic message to the appropriate address.

* * * * *